(12) United States Patent
Taubert et al.

(10) Patent No.: US 7,614,671 B2
(45) Date of Patent: Nov. 10, 2009

(54) CLOSURE ELEMENT

(75) Inventors: Uwe Taubert, Weinheim (DE); Dieter Juling, Kelkheim (DE); Anja Schulze, Darmstadt (DE)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 11/625,790

(22) Filed: Jan. 22, 2007

(65) Prior Publication Data

US 2007/0194588 A1    Aug. 23, 2007

(30) Foreign Application Priority Data

Jan. 24, 2006    (DE) .................. 20 2006 001 129 U

(51) Int. Cl.
*E05B 3/00*    (2006.01)

(52) U.S. Cl. .................. 292/336.3; 292/353; 410/116; 16/420; 296/37.2; 296/37.14

(58) Field of Classification Search .................. 292/57, 292/58, 60, 62, 336.3, 353; 296/37.2, 37.3, 296/37.14, 97.23; 24/599.8; 411/342, 344, 411/345; 410/116; 16/419, 420, 445, 446
See application file for complete search history.

(56) References Cited

U.S. PATENT DOCUMENTS

| | | | | | |
|---|---|---|---|---|---|
| 1,570,281 | A | * | 1/1926 | Raymond | .................. 24/581.1 |
| 2,276,915 | A | * | 3/1942 | Axe et al. | ...................... 292/60 |
| 4,297,963 | A | * | 11/1981 | Beacom | .................. 114/230.29 |
| 5,028,083 | A | | 7/1991 | Mischenko | |
| 5,056,846 | A | | 10/1991 | Tanaka | |
| 5,199,733 | A | * | 4/1993 | DeLorme | .................... 280/515 |

FOREIGN PATENT DOCUMENTS

| | | |
|---|---|---|
| DE | 92 17 849.9 U1 | 4/1993 |
| DE | 101 56 692 A1 | 5/2003 |
| DE | 10 2004 027 85 A1 | 1/2005 |
| WO | WO 00/46473 A1 | 8/2000 |
| WO | WO 03/004200 A1 | 5/2003 |

\* cited by examiner

*Primary Examiner*—Gary Estremsky
(74) *Attorney, Agent, or Firm*—Greenberg Traurig, LLP

(57) ABSTRACT

A closure element for a detachable, locking storage area in a motor vehicle is disclosed. The closure element comprises at least one clamping element designed for securing to a first component, in particular a plate-type component, by means of an elastic element, and with a handle which is pre-clamped by an elastic element for clamping a second component between the clamping element and the handle.

1 Claim, 5 Drawing Sheets

CLOSURE ELEMENT

Figure 1:
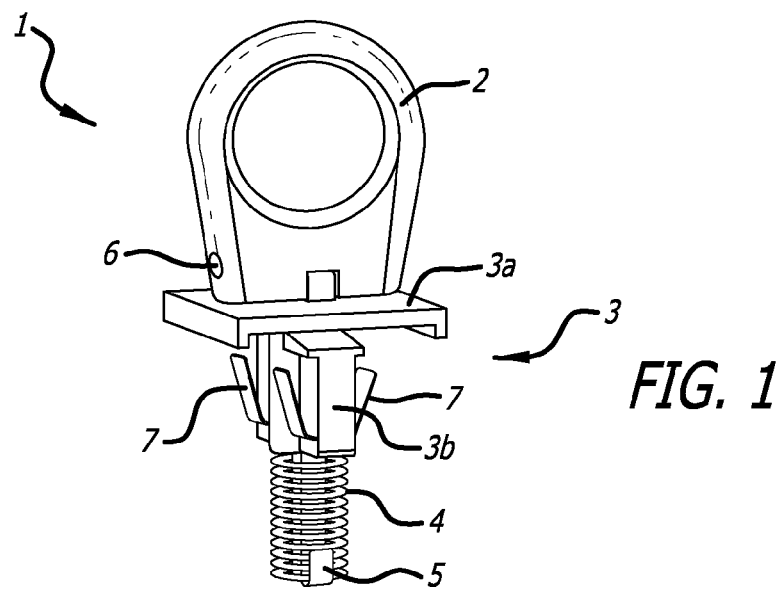

This application claims priority to German Application No. 20 2006 001 129.3, filed on Jan. 24, 2006. The entire teachings of the referenced Application is incorporated herein by reference.

The invention relates to a closure element, particularly for a detachable, locking storage area in a motor vehicle or the like, with at least one clamping element which is designed for securing to a first component, in particular a plate-type component, by means of an elastic element, and with a handle which is pre-clamped by an elastic element for clamping a second component, in particular a plate-type component, between the clamping element and the handle against at least one clamping element.

In the trunk of a motor vehicle a so-called storage area is nowadays often provided, forming a flat surface in the trunk. Such a storage area is in most cases a plate which is arranged in the trunk of a vehicle so that the plate can easily be removed, for example to allow access to a compartment arranged underneath the storage area for a spare wheel, tools or the like. In order to close such a compartment securely, and avoid rattling noises during travel, such a storage area must be fixed in the trunk. For this purpose different closure elements are used with which a storage area is clamped, engaged or retained by spring force. These systems of prior design are in some cases very expensive to fit and/or difficult for a user to handle.

Storage areas which can be completely removed from the trunk, and can be reversed, are also frequently used now. Here, for example, one side is made flat and is provided with decorative material so that this side faces the interior of the trunk during normal use. The opposite side may be designed, for example, so that it incorporates a loading trough or additional means of fixing not prone to soiling. For example, this side may be coated with plastic or rubber. This side is therefore often facing the interior of the trunk when soiled/dirty objects are to be transported. Such storage areas that can be used on both sides impose heavy demands on their closure elements because the storage areas have to be securely fixed in both positions.

A closure element of the type already mentioned is known for securing a storage area that can be used on both sides, which element is formed by a connecting clamp on which a shim is pre-tensioned by a compression spring against a handle. To assemble a storage area in a vehicle trunk the handle is first inserted from below through a slot in the floor plate of the trunk or the like area, so that the handle projects upwards from this slot. By pulling on the handle it is pulled completely out of the slot against the force of the spring, wherein the shim comes to rest on the bottom of the floor plate. In this position a U-shaped, plate-type clamping element is pushed laterally between the floor plate and the handle so that the clamping element comes to rest on the connecting clamp. Such a slotlike opening in the clamping element is in this case made so that the handle can no longer pass through the clamping element, and so that the entire closure element is clamped by the force of the spring on the floor plate which is received between the shim and the separate clamping element. The handle can now be guided through a storage area also provided with a slotlike recess and can be pulled further through it against the force of the spring. The recess in the storage area is in this case made so that its length is greater than its width. It is therefore possible for the handle to be fixed in a position pulled through the storage area when it is rotated 90° relative to the storage area. The storage area can therefore be secured on the floor plate of the trunk or the like area.

On the other hand, one object of this invention is to provide a closure element which is suitable for the detachable locking of a storage area that can be used on both sides and enables a storage area with good handling characteristics to be securely fixed by a user.

This object is essentially achieved with a closure element of the type already mentioned in that at least one of the clamping elements, the elastic element, and the handle, are combined to form a commonly mountable unit. When the closure element is assembled in a vehicle, for example, it is therefore no longer necessary to secure the clamping element to the pre-assembled closure element. On the contrary, it is possible to secure the entire integral closure element to the floor plate of a trunk or the like area.

In a development of the concept of the invention provision is made for stop hooks and/or clamps to be fitted on a first component, in particular resilient stop hooks and/or clamps. The closure element can therefore be inserted from above in a correspondingly designed recess in the floor plate of a trunk or the like area, and fixed there by the stop hooks or clamps. Insertion and engagement of the closure element according to the invention from above is particularly simple compared to the assembly of a closure element, which is first inserted in a recess from the bottom of a floor plate and then locked from the opposite upper side of the floor plate or the like area. This allows not only faster assembly of the closure element in a vehicle or the like, but also provides improved protection against accidental loosening of the closure element, from the floor plate, for example.

In a further development of this concept provision is made for the stop hooks and/or clamps to be designed integrally with the clamping element, or to be inserted and/or cast in it. The assembly of the closure element according to the invention before the assembly of the clamping element, e.g. in a vehicle, is facilitated thereby.

According to a further embodiment of the invention a first clamping element is arranged so that it can be rotated relative to a second clamping element, the two clamping elements each having projections and recesses adapted to them, and each being capable of being swiveled from the assembly position in which the projection are in contact with each other at the front, by rotating the clamping elements toward each other into a locking position in which the projections engage in the recesses. The projections and recesses may in this case be designed so that an essentially oblong cross-section is formed when the projections are in contact with each other at the front in the assembly position. On the other hand, a circular cross-section is formed in the locking position by the two clamping elements so that they cannot be pushed out of the slotlike opening.

It is also preferable for the projections to engage in the locking position between two legs of a stop clamp, thereby locking them. In this embodiment a particularly effective protection of the closure element according to the invention against accidental detachment from a floor plate or the like area is therefore possible when, in particular, the two clamping elements are swiveled 90° relative to each other from their assembly position into the locking position.

To avoid rattling noises, the first component is preferably additionally clamped by means of an elastic element. For this purpose two clamping elements may be provided which are pre-clamped against each other by an elastic element for fastening to the first component, e.g. a floor plate.

When at least one clamping element is formed from two regions that can be swiveled in relation to each other, which regions can be swiveled from an essentially collapsed assembly position into an unfolded locking position, a particularly effective protection of the closure element against accidental extraction from the first component, i.e. a floor plate or the like, can be achieved. In their collapsed assembly position the regions of the clamping element that can be swiveled can be satisfactorily inserted through a slotlike opening. However, after collapsing into their locking position, these regions that can be swiveled can then no longer be pulled through the slotlike opening.

In a further development of this concept of the invention it is preferable for a first clamping element to be provided with bridges or the like projections on its side facing a second clamping element, between which projections the two regions of the second clamping element that can be swiveled are fixed in the assembly position. This can also be achieved, in particular, by pre-clamping the swiveled regions between the bridges by means of the elastic element. This retains the regions of the closure element that can be swiveled securely in their assembly position until they are transferred automatically or by means of a tool to their locking position.

In at least one the clamping elements, the handle and the elastic element can preferably be swiveled relative to each other and a connecting clamp or clip passed through them. In this case, at least one clamping element is pre-clamped against the handle by the elastic element. Since all the components of the closure element are held together by the connecting clamp, the closure element according to the invention may be assembled as one unit.

The invention further relates to a floor element, in particular a storage area for a vehicle or aircraft, with a plate-type component with which at least one closure element is associated for detachable fixing. In the plate-type component at least one recess is provided whose length is greater than its width, and whose size is at least equal to the size of the handle.

The handle may in this way be inserted through the plate-type component, i.e. the storage area, in a first position, whilst the handle is protected against slipping through the slotlike recess in a second position, for example a position swiveled 90° relative to the plate-type component.

To enable the storage area to be secured with the closure element according to the invention, the spring path of the elastic element is equal to at least the thickness of the plate-type component (storage area).

In the floor element according to the invention the two surfaces of the plate-type component opposing each other, i.e. the surfaces of the storage area, for example, are provided with different materials, e.g. with a plastic or rubber surface on one side and with a fabric surface on the other.

Further advantages and possible applications of the invention are evident from the following description of embodiments and the drawing. Here all the characteristics described and/or diagrammatically represented together constitute the object of the invention, independently of their summary in the claims or their references.

DIAGRAMMATICALLY

Figure 2A:
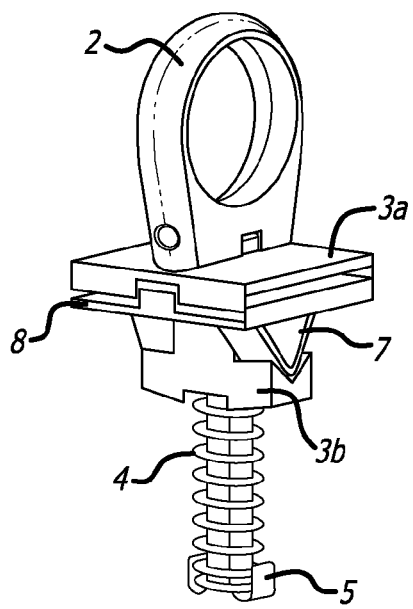
Figure 2B:
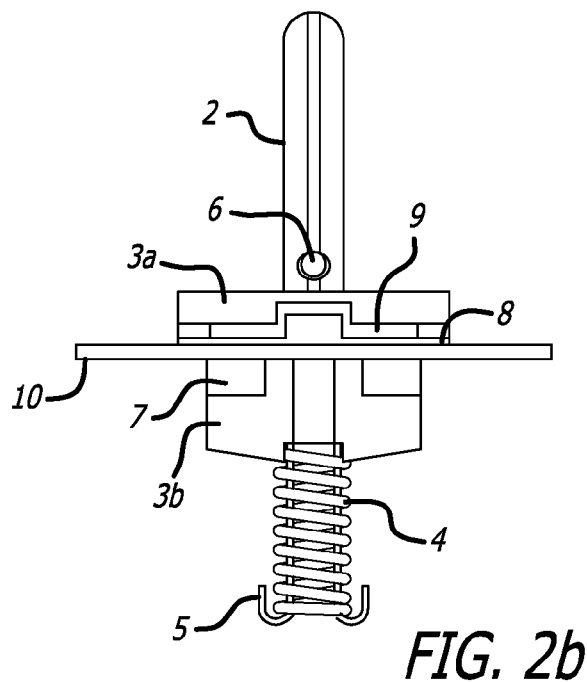
Figure 3:
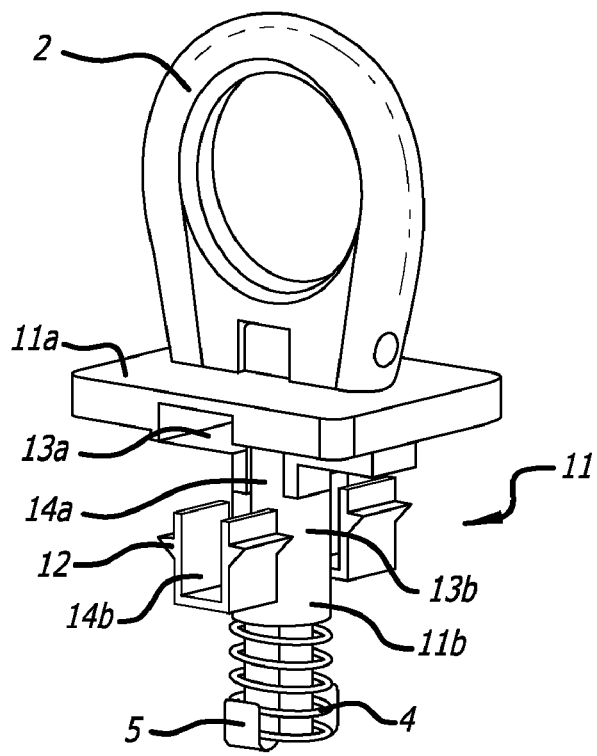
Figure 4:
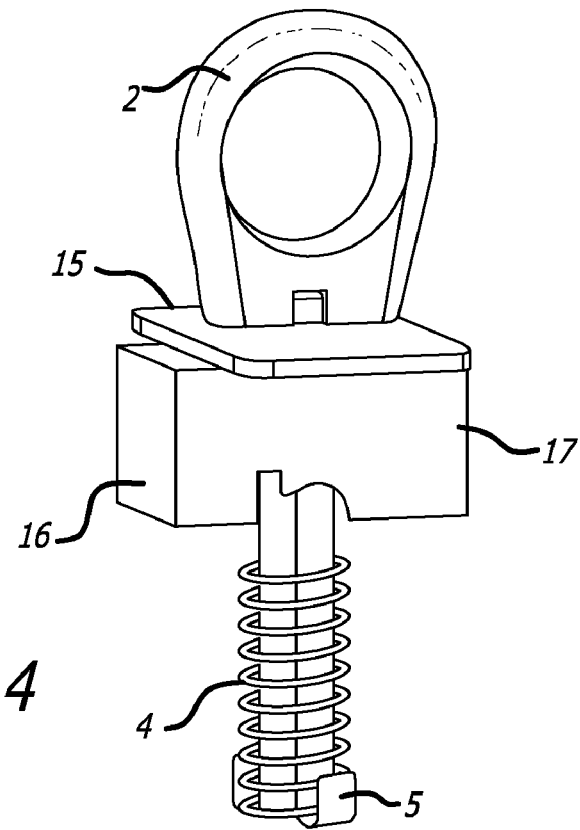

FIG. 1 shows in a perspective view a closure element according to a first embodiment of the invention, FIG. 2a shows in a perspective view a closure element according to a second embodiment of the invention, FIG. 2b shows in a side elevation the closure element according to FIG. 2a, FIG. 3 shows in a perspective view a closure element according to a third embodiment of the invention, FIG. 4 shows in a perspective view a closure element according to a fourth embodiment of the invention, and FIGS. 5a to 5i show the assembly of the closure element according to FIG. 4 and the securing of a storage area by this closure element.

Closure element 1 represented in FIG. 1 is essentially formed by a handle 2 with an annular opening, a base designed as a clamping element 3 and a compression spring 4, which are retained on a connecting clamp 5 or a clip, which extends through clamping element 3. Connecting clamp 5, as shown in FIGS. 2a and 2b, is designed as a loop from a strip of sheet steel, which is overturned on its end facing away from handle 2. A pin 6 is passed through the end of connecting clamp 5 on the handle side so that handle 2 can be swiveled about the axis of pin 6 relative to clamping element 3 and connecting clamp 5. Furthermore, handle 2 may also be rotated about a vertical axis shown in FIG. 1 relative to clamping element 1.

The base-type clamping element 3 exhibits a plate 3a facing handle 2 and projections 3b are arranged at a distance from the plate, underneath it, in which projections stop hooks 7 are cast in the design according to FIG. 1. Stop hooks 7 are formed from spring steel and may be swiveled elastically inwards, for example in order to pass through a slotlike opening. The representation in FIG. 1 shows the unloaded position of stop hooks 7.

Compression spring 4 is supported on the lower peripheral edge of connecting clamp 5 and is designed so that it elastically pre-clamps clamping element 3 against handle 2 in the condition shown in FIG. 1. Handle 2 may consequently be pulled vertically upwards against the force of spring 4 and raised from clamping element 3.

FIGS. 2a and 2b show a second embodiment of a closure element which has essentially the same construction as closure element 1 explained above with reference to FIG. 1. However, stop hooks 7, as can be seen in FIG. 2a, are not cast in projections 3b of clamping element 3 but are inserted or clamped laterally in corresponding recesses in projections 3b. Moreover, the closure element is fitted with an additional clamping element 8, which is designed in the shape of a plate and is arranged between plate 3a of clamping element 3 and stop hook 7.

As can be seen from the view in FIG. 2b, an elastic element 9 is arranged between clamping element 8 and plate 3a of clamping element 3, which element can be designed integrally with the first and/or second clamping element 3 or 8 respectively.

A closure element is mounted on a plate-type component, for example a floor plate 10 of a vehicle trunk, indicated in FIG. 2b, by inserting the closure element from above in a slotlike opening in floor plate 10. Here the slotlike opening is preferably made so that its inner contour corresponds essentially to the outer contour of the section formed by projections 3b of clamping element 3. The lower end of connecting clamps 5, with compression spring 4 and the section of projections 3b, may therefore be inserted in floor plate 10 through the opening. In this case stop hooks 7 are elastically compressed so that they are able to pass through floor plate 10. In FIG. 2b stop hooks 7 are swiveled outwards back to their position shown in FIGS. 1 and 2a, because of their elastic readjusting forces, so that the closure element can no longer be pulled up through the opening in floor plate 10.

The force of spring 9 forces the plate-type second clamping element 8 against the top of floor plate 10 so that floor plate is clamped by the spring-loaded clamping element 8 between the plate-type region 3a of the first clamping element and stop hook 7. In this position handle 2 can now be pulled vertically upwards relative to the first clamping element 3 and floor plate 10 against the force of compression spring 4, so that handle 2 is raised from plate-type region 3a of clamping element 3. This creates a clearance between the bottom of handle 2 and the top of clamping element 3, in which clearance a plate-type component, e.g. a storage area 19 indicated in FIG. 5i, can be clamped by the force of compression spring 4.

A further design of a closure element is shown in FIG. 3. In this design handle 2, compression spring 4 and connecting clamps 5 are designed as described above. However, clamping element 11 arranged between compression spring 4 and handle 2 is formed from an upper plate-type region 11a and a separate lower region 11b, with stop clamps 12. Here connecting clamp 5 passes through both separate regions 11a and 11b of clamping element 11 so that they can be rotated relative to each other.

As FIG. 3 shows, both the upper plate-type region 11a and lower region 11b of clamping element 11 are each provided with two projections 13a and 13b respectively, as well as two recesses 14a and 14b respectively. FIG. 3 shows the closure element in an assembly position in which projections 13a and 13b lie adjacent to each other at the front and recesses 14a and 14b lie flush with each other. Recesses 14b also extend into an intermediate space between stop clamps 12, so that they can be pressed elastically inwards in the assembly position shown in FIG. 3 in order to pass through an opening in a floor plate 10, as described above.

After passing through an opening in floor plate 10, for example, the legs of stop hooks 12 swivel elastically back into the position shown in FIG. 3. In order to lock the closure element on floor plate 10, the plate-type upper region 11a is now rotated 90° relative to the lower region 11b. Projections 13a of plate-type region 11a then oppose recesses 14b of lower region 11b, and projections 13b correspondingly oppose recesses 14a. Projections 13a and 13b, as well as recesses 14a and 14b, are in this case adapted to each other so that they are able to engage in each other. After plate-type region 11a is rotated relative to lower region 11b, projections 13a and 13b therefore engage in recesses 14b and 14a respectively due to the force of compression spring 4. As a result of this, projections 13a also lie in recess 14b between the legs of stop clamps 12, locking them so that stop clamps 12 can no longer be compressed and consequently can no longer pass through an opening in floor plate 10. Here compression spring 4 pre-tensions 12 the stop clamp against floor plate 10, on whose opposite side lies plate-type region 11a of clamping element 11. Floor plate 10 is therefore clamped elastically between the two regions 11a and 11b of clamping element 11.

FIG. 4 shows a fourth embodiment of a closure element where handle 2, compression spring 4 and connecting clamps 5 are again designed as explained above. In this design two clamping elements 15 and 16 are provided between compression spring 4 and handle 2, connecting clamp 5 passing through both these elements. Here clamping element 16 is also provided with two swivel regions 16 and 16, as also shown, in particular, in FIGS. 5c to 5e, which regions are shown in FIGS. 4 and 5c in their essentially collapsed assembly position. Bridges 17, which have an interruption, are provided on the side of plate-type clamping element 15 facing clamping element 16, so that both regions 16 and 16b are retained between bridges 17.

Figure 5A:
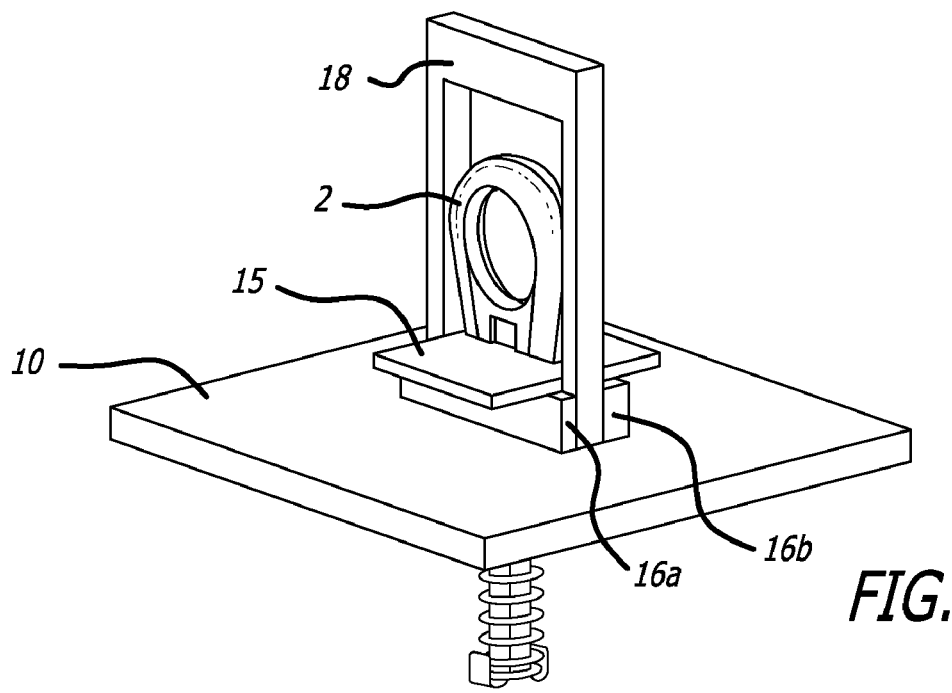

As shown in FIG. 5a, the clamping unit in this assembly position can be inserted in a slotlike opening in a plate-type component, e.g. a floor plate 10 of a trunk floor, by means of a tool 18 which rests on the articulated section connecting regions 16 and 16b.

Figure 5B:
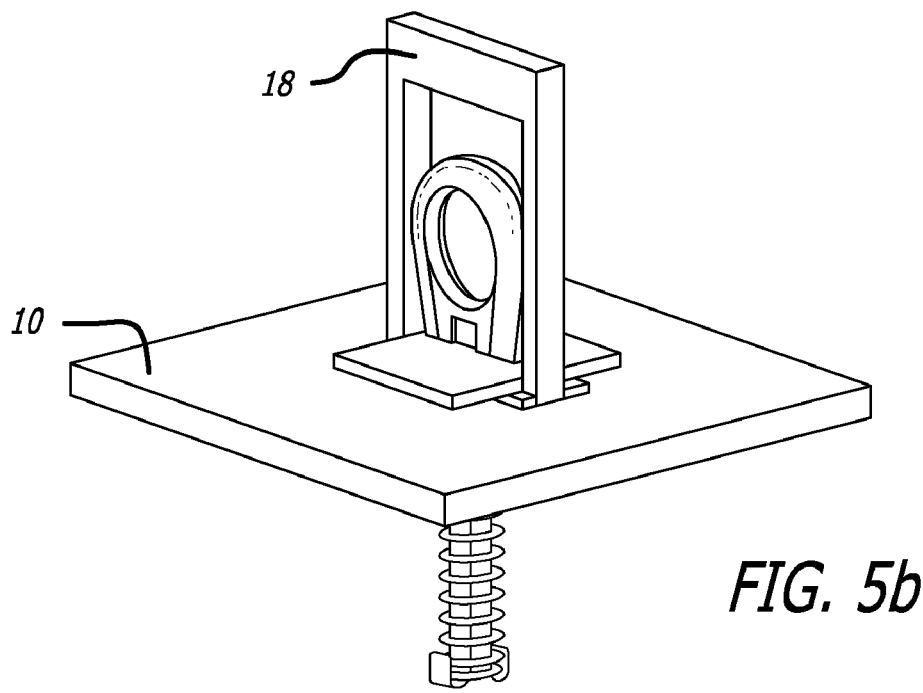
Figure 5C:
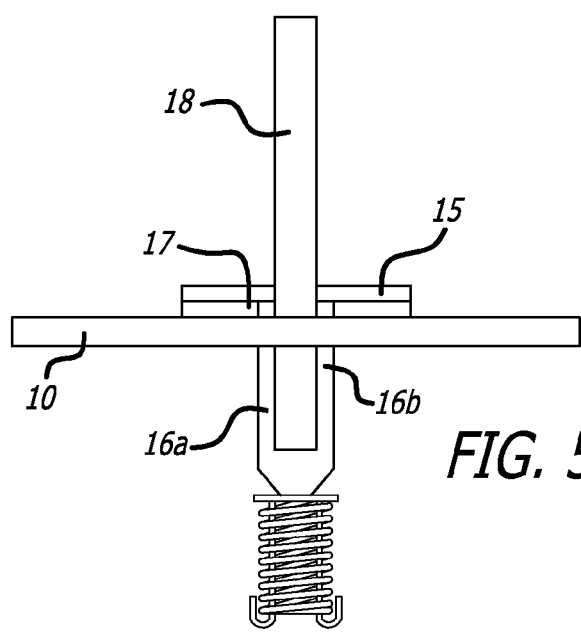
Figure 5D:
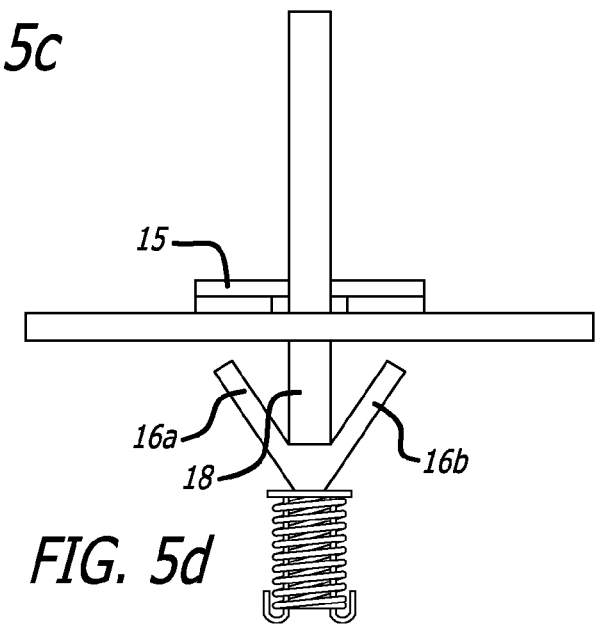

The size of the opening in floor plate 10 is in this case made so that connecting clamps 5, compression spring 4 and both regions 16a and 16b of clamping element 16 are able to pass through the opening in the assembly position. The closure element is pressed by tool 18 into the opening until bridges 17 of clamping element 15 lie on the top of floor plate 10, as shown in FIGS. 5b and 5c. Now when clamping element 16 is pressed further downwards by tool 18 against the force of compression spring 4, as shown in FIG. 5d, regions 16 and 16 become detached from their locking position between bridges 17 and can be swiveled outwards.

Figure 5E:
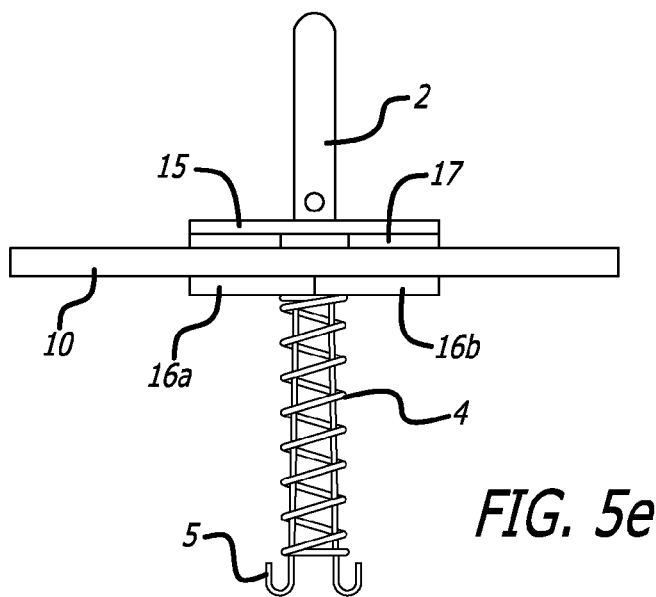
Figure 5F:
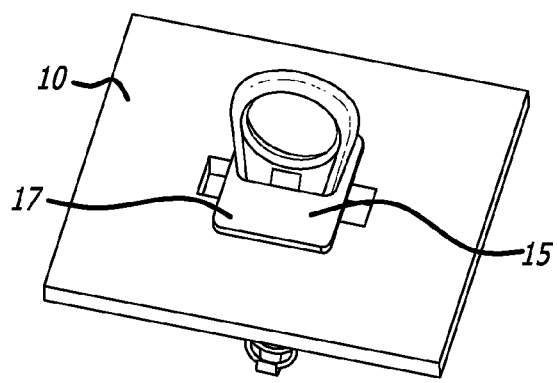
Figure 5G:
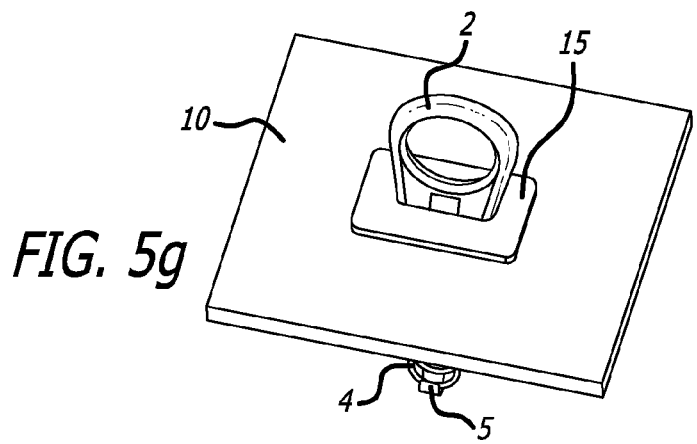
Figure 5H:
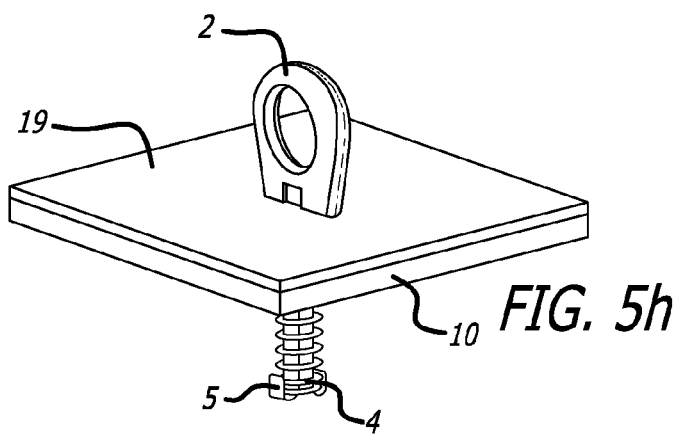

Now if tool 18 is pulled up, spring 4 forces both regions 16a and 16b from below against floor plate 10, as shown in FIG. 5e, regions 16a and 16b being swiveled into a collapsed locking position in which they can no longer pass through the opening in floor plate 10. This position is also shown in FIG. 5f. Clamping element 15 can then be rotated 90° relative to clamping element 16 and 90° relative to floor plate 10, so that both bridges 17 engage in the opening in floor plate 10. Floor plate 10 is then clamped by the force of spring 4 between clamping elements 15 and 16.

For securing storage area 19, handle 2 is raised from floor plate 10 against the force of spring 4, so that handle 2 extends through the slotlike opening in storage area 19. The handle is pulled up until it has completely passed through the slotlike opening in the storage area 19. In this position handle 2 can be rotated 90° relative to storage area 19 about a vertical axis so that handle 2 can no longer lead back through the slotlike opening in storage area 19. Instead, storage area is forced by the force of spring 4 by handle 2 against floor plate 10 so that storage area 19 is fixed in a trunk or like area.

Figure 5I:
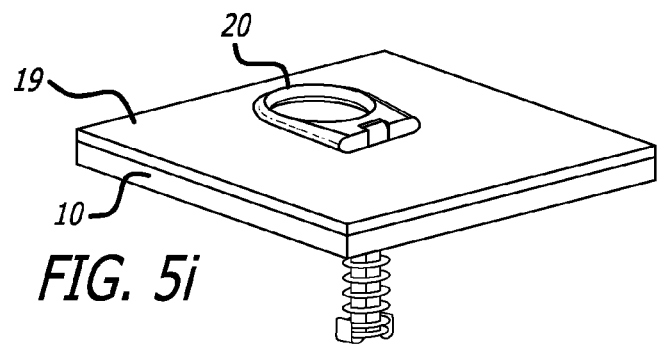

Furthermore, a recess 20 can be formed in storage area 19 so that handle 2, as shown in FIG. 5i, can be folded into the recess in its position locking storage area 19 about the axis of pin 6. In this position handle 2 lies essentially in the same plane as the surface of storage area 19.

LIST OF REFERENCES

1 Closure element
2 Handle
3 Clamping element
3a Plate-type region
3b Projection
4 Compression spring
5 Connecting clamp
6 Pin
7 Stop hook
8 Clamping element
9 Elastic element
10 Plate-type component (floor plate)
11 Clamping element
11a Plate-type region
11b Lower region
12 Stop clamp
13a, 13b Projection
14a, 14b Recess
15 Clamping element
16 Clamping element
17 Bridge
18 Tool
19 Plate-type component (storage area)
20 Recess

The invention claimed is:
1. A closure element comprising:
a handle,
wherein the handle is formed with an annular opening;
a clamping element, wherein the clamping element has a plate-type component and at least one projection;
at least one stop hook,
wherein the at least one stop hook is cast underneath the at least one projection of the clamping element;
a compression spring,
wherein the clamping element is located between the compression spring and the handle;
a connecting clamp,
wherein the handle, the clamping element, and the compression spring are connected by the connecting clamp; and
at least one pin,
wherein the at least one pin passes through the handle and the connecting clamp thereby allowing for the handle to swivel about the axis of the pin.

* * * * *